United States Patent [19]

Goldstein et al.

[11] Patent Number: 4,721,271
[45] Date of Patent: Jan. 26, 1988

[54] DEVICES AND METHOD FOR ROCKET BOOSTER VECTORING TO PROVIDE STABILITY AUGMENTATION DURING A BOOSTER LAUNCH PHASE

[75] Inventors: Sidney E. Goldstein, Kirkland; Ronald J. Pera, Seattle, both of Wash.

[73] Assignee: The Boeing Company, Seattle, Wash.

[21] Appl. No.: 701,381

[22] Filed: Feb. 14, 1985

[51] Int. Cl.$^4$ .............................................. B64C 15/12
[52] U.S. Cl. ..................................... 244/75 R; 244/58; 244/54; 244/63; 244/52
[58] Field of Search ................. 244/52, 58, 76 A, 160, 244/50, 51, 56, 63, 74, 2, 3.22, 54, 75 R

[56] References Cited

U.S. PATENT DOCUMENTS

| | | | |
|---|---|---|---|
| 2,506,976 | 5/1950 | Tharratt | 244/74 |
| 2,544,830 | 3/1951 | Grill et al. | 244/137 |
| 2,745,347 | 5/1956 | Lightbody et al. | 102/49 |
| 2,776,622 | 1/1957 | Robert | 102/49 |
| 2,814,453 | 11/1957 | Trimble, Jr. et al. | 244/63 |
| 2,971,725 | 2/1961 | Jakimiuk | 244/63 |
| 2,995,319 | 8/1961 | Kershner et al. | 244/52 |
| 3,070,329 | 12/1962 | Hasbrouck | 244/52 |
| 3,114,520 | 12/1963 | Finvold | 244/52 |
| 3,897,030 | 7/1975 | Cors et al. | 244/63 |
| 4,163,534 | 8/1979 | Seeger | 244/3.22 |

*Primary Examiner*—Galen Barefoot
*Attorney, Agent, or Firm*—Eugene O. Heberer; Delbert J. Barnard

[57] ABSTRACT

Rocket booster motor vectoring system and method for shortening take-off distance of aircraft, the aircraft being airborne before it is going fast enough for its conventional controls to provide adequate stability and control. A rocket booster motor (52) is coupled to aircraft (50) by means of thrust arm link (56) is pivotal engagement with the aircraft and fixed to the booster, and coupled by rearwardly positioned links (62, 64, 66) having ball and socket joints at both ends, one end being connected to the aircraft through aerodynamic surfaces (68, 70) or through actuators (124, 126), the aerodynamic surfaces being operable by conventional systems within the basic aircraft, and the actuators also being operated by motion sensing systems within the aircraft to vector the thrust of the booster to provide stability augmentation of the aircraft during the boosted launch phase to provide pitch, roll, and yaw control. The thrust vector is rotated or directed in response to signals generated in the basic aircraft control systems.

24 Claims, 14 Drawing Figures

NOSE DOWN

NULL

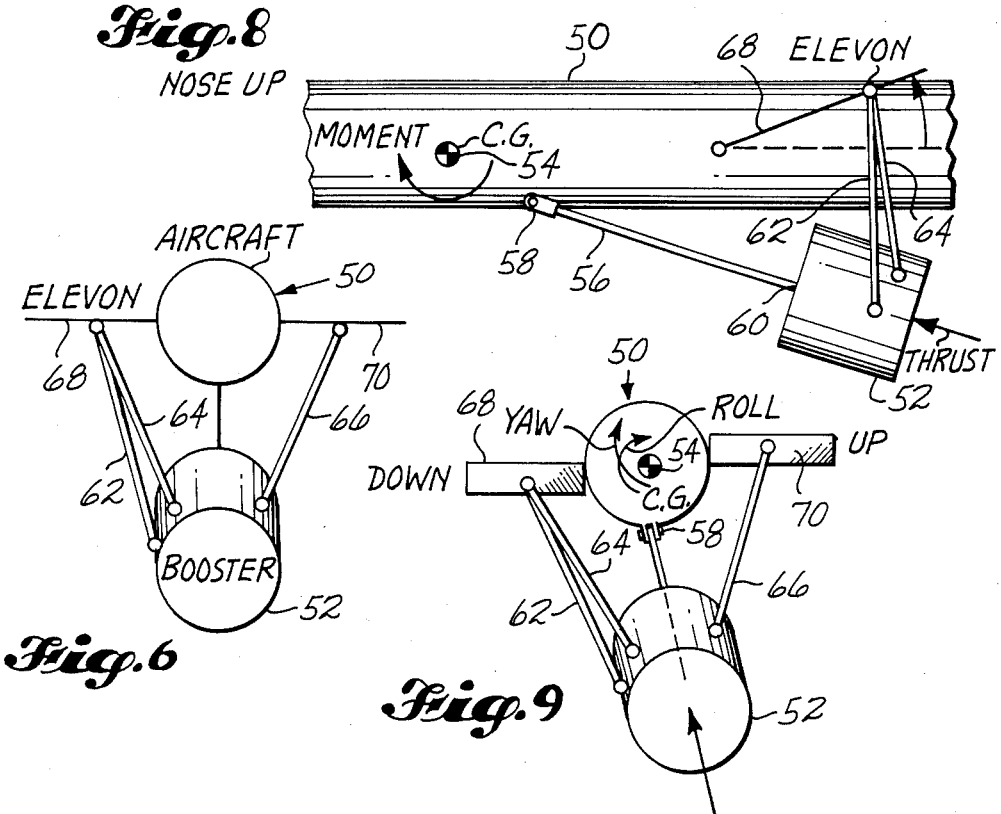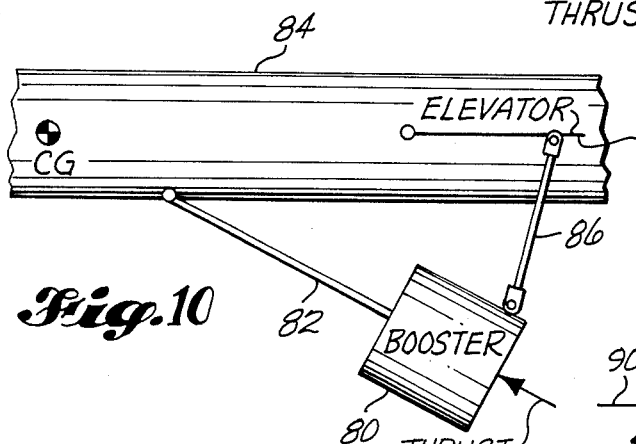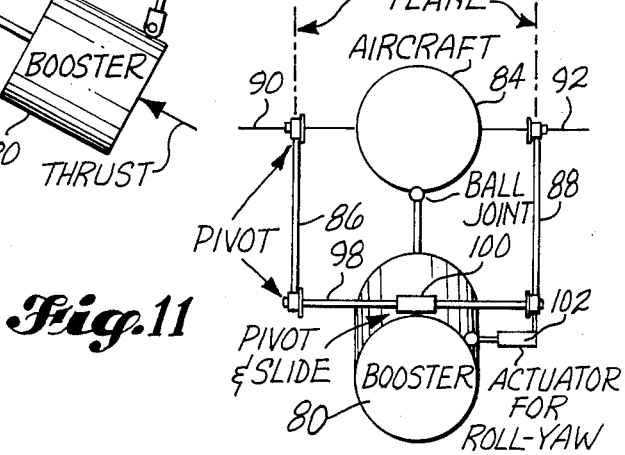

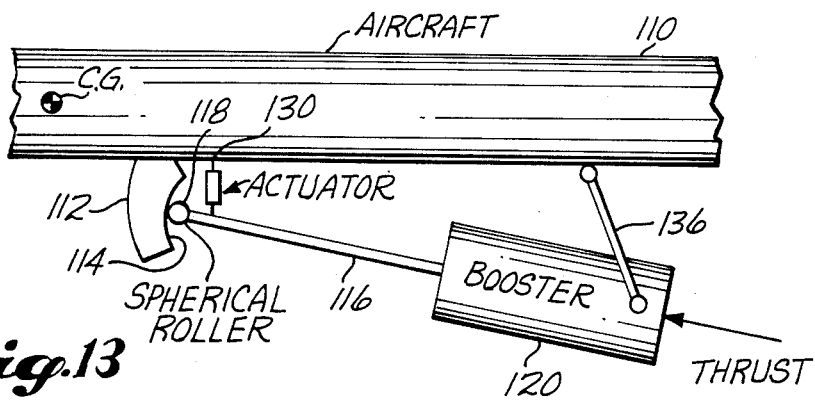
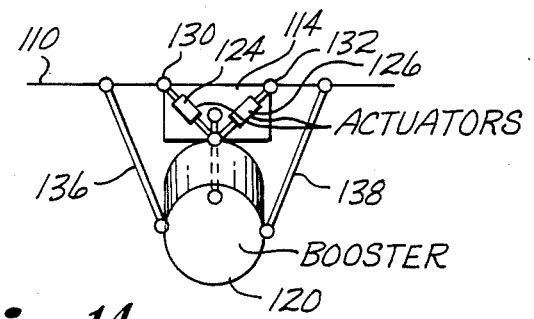

DEVICES AND METHOD FOR ROCKET BOOSTER VECTORING TO PROVIDE STABILITY AUGMENTATION DURING A BOOSTER LAUNCH PHASE

DESCRIPTION

1. Technical Field

The invention relates to the use and combination of a rocket booster motor for providing additional stability and control required during a booster launch phase of an aircraft. Aircraft is defined as including airplanes, missiles, and airborne vehicles.

2. Background Art

In the prior art, during rocket assisted take-offs of aircraft, ther have been problems of thrust misalignment, stability, and control of the aircraft. Auxiliary rocket engines or jato bottles have been provided for additional acceleration when flying speed must be attained in very short distances. The aircraft flies before it is going fast enough for its conventional controls to provide adequate stability and control. If the vehicle has aerodynamic controls only, the following problems tend to occur:

1. The center of gravity of the combined vehicle plus a booster is generally farther aft than for the basic vehicle. This results in reduced stability or an unstable vehicle. Both of these conditions demand additional control power.
2. If the booster thrust is not precisely aligned to pass very close to the center of gravity, large torques are generated, placing additional demands on the control system.
3. The available aerodynamic control is severely limited at the low launch speeds.

In the prior art to avoid or solve the above problems, the practice for controlling booster vehicles varied depending upon the mission and configuration. For space vehicles some form of reaction control was generally used and stabilizing fins may have been added to the booster. For airplanes and airborne missiles, of particular concern in this application, the solutions have been a mix of the following:

1. The size of the aerodynamic controls have been increased over that required for flight after boost.
2. Stabilizing fins have been added to the booster.
3. The manufacturing tolerances on booster rocket nozzles have been limited to provide a precision installation.
4. A separate, self-contained stability and control unit has been provided in the booster and either a jet deflector vane or a gimballed nozzle has been incororated.

The first, second, and last solutions, listed above, burden either the basic, non-boosted, vehicle or the booster. The third and fourth, listed solutions, are very costly. Further, the above solutions have resulted in penalties of either reduced performance of the basic vehicle, increased weight and/or increased cost, and complexity.

A search of the patent literature including rocket motor boost systems has revealed the following. For example, U.S. Pat. No. 3,897,030, to Cors et al discloses a rocket motor attached to the aircraft and which is responsive to changes which occur in a control system so as to move the motor in response to the changes.

The following patents disclose systems of general interest:
U.S. Pat. No. 2,544,830—Grill et al.
U.S. Pat. No. 2,745,347—Lightbody et al.
U.S. Pat. No. 2,776,622—Robert,
U.S. Pat. No. 2,814,453—Trimble, Jr. et al.,
U.S. Pat. No. 2,971,725—Jakimiuk,
U.S. Pat. No. 3,070,329—Hasbrouck,
U.S. Pat. No. 3,114,520—Finvold.

DISCLOSURE OF THE INVENTION

Modern aircraft have motion sensors and required logic coupled to aerodynamic controls, such as elevons, ailerons, elevators, and rudder, for augmenting stability in post launch phases of climb, high speed flight, and landings. the aerodynamic controls are sized to provide sufficient control power at these speeds.

According to the invention, rocket motors are attached to the aircraft by supporting members or links that are connected by shear pins or other self-releasable means so that the rocket motors are released from the aircraft after take-off. The invention is comprised of means and a method for coupling a rocket booster motor to an aircraft, or for an aircraft in combination therewith, so that the rocket booster thrust vector is directed as a single unit by the aerodynamic controls in the basic aircraft to provide the additional stability and control required during a boosted launch phase. Relatively small motions are required because large torques are generated at low speed.

These torques are generated by the relatively large and constant thrust vector moved by the aerodynamic controls to control the pitch, roll, and yaw of the aircraft, as well as to provide the acceleration forces required to achieve unboosted flight. This is accomplished with no changes required in the flight control logic or system.

The means for coupling the rocket booster motor to at least some of the aerodymanic surfaces of the controls are operated in accordance with signals from motion sensors and/or logic in the aircraft to the controls, so that the rocket thrust vector is directed as a single unit into automatic alignment in direct proportion to the signals and relative to the center of gravity of the aircraft so that travel of the aircraft is commanded through the flight control and logic system to prevent genertion of excessive torques, to avoid placing additional demands on the controls, to aovid severely limiting of available aerodynamic control at low launch speeds, and to provide pitch, roll, and yaw control.

The means for coupling may be in the form of supporting links having ball joints at at least one end. A forward link of the supportin glinks has a forward end for pivotal connection to the aircraft aft of tis center of gravity and has a rearward end fixed to the rocket motor. There is a first rear link having ball joints at both ends, one of said ends of the first rear link being connectable to a control on one side of the aircraft, and the other end of the first rear link is connected to a corresponding one side of the rocket motor. Second and third rear links have ball joints at both ends, one of the ends of each second and third rear links being connectable to a control on the other side of the aircraft. The other ends of the second and third links are spacedly connected to a corresponding other side of the rocket motor.

In another embodiment, an actuator is connected to supporting links and to the rocket motor to move the motor transversely with respect to the aircraft to provie for roll-yaw control.

For missiles in which no aerodynamic control surfaces are available for actuation of the rocket booster, a separate system is used. For example, the coupling means include a forward link having a spherical roller on its forward end for rollable contact on a concave spherical member securable to the aircraft and having a rearward end fixed to the rocket motor. There is a first rear link having ball joints at both ends, one of the ends of said first rear link being connectable to the aircraft and th other end of the first rear link being connectd to the rocket motor. There are a pair of actuators having one end of each joining the forward link between the spherical roller and its fixed end. The actuators are angularly positioned so that their other ends are spaced and are connectable to the aircraft whereby a forward thrust point in the spherical roller is movable on the concave spherical member by the actuators to provide pitch, roll, and yaw control to the aircraft through the thrust vector of the rocket motor.

One benefit of the booster vectoring, according to the invention, is that the alignment of the thrust vector to the aircraft center of gravity is not critical. Normal production tolerances are sufficient. The flight control system moes the thrust vector to yield the required moments and forces for controlled flight.

The invention provides the following advantages:
1. Additional control power is made available for manging thrust misalignment and instability during rocket boost.
2. This additional control power is obtained with little penalty or change to either the basic aircraft or the booster.
3. Elements of the basic aircraft stability augmentation system are used.
4. The additional control power is gained with a relatively simple system and small weight penalty.
5. The system shall cost less in terms of dollars and performance penalties than competitive systems.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 6 is a rear end view of the aircraft and booster shown in FIG. 5;

FIG. 8 is another side elevational view of the aircraft in FIG. 5 in which an elevon is deflected upwardly to provide a resulting upwardly pitch;

FIG. 9 is an end view of the aircraft similar to that shown in FIG. 6 in which the elevon on one side is up and that on the other side is down so as to produce a roll-yaw couple for the aircraft;

FIG. 10 is a schematic side elevational view of an aircraft in which the rocket booster is connected to elevators;

FIG. 11 is an end view of the aircraft shown in FIG. 10 in which an actuator attached to the booster supports provides for roll-yaw control;

FIG. 13 is a side elevational view of an aircraft in which no control surfaces are available for actuation of the rocket booster motor; and FIG. 14 is an end view of the aircraft shown in FIG. 13 in which a forward thrust point is moved by two actuators that provide pitch, roll, and yaw control.

BEST MODE FOR CARRYING OUT THE INVENTION

Figure 1:
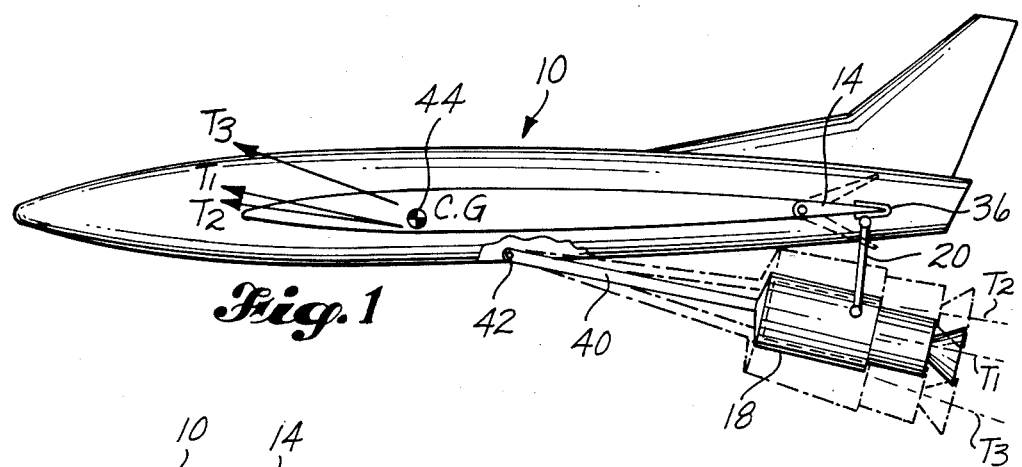
FIG. 1 is a side elevational view of an aircraft having a launch phase booster connected to elevons and illustrating pitch control operation.
Figure 2:
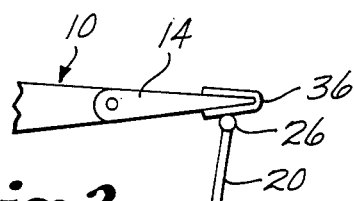
FIG. 2 is a fragmentary view illustrating a detachable connection between the booster and an elevon in FIG. 1.
Figure 3:
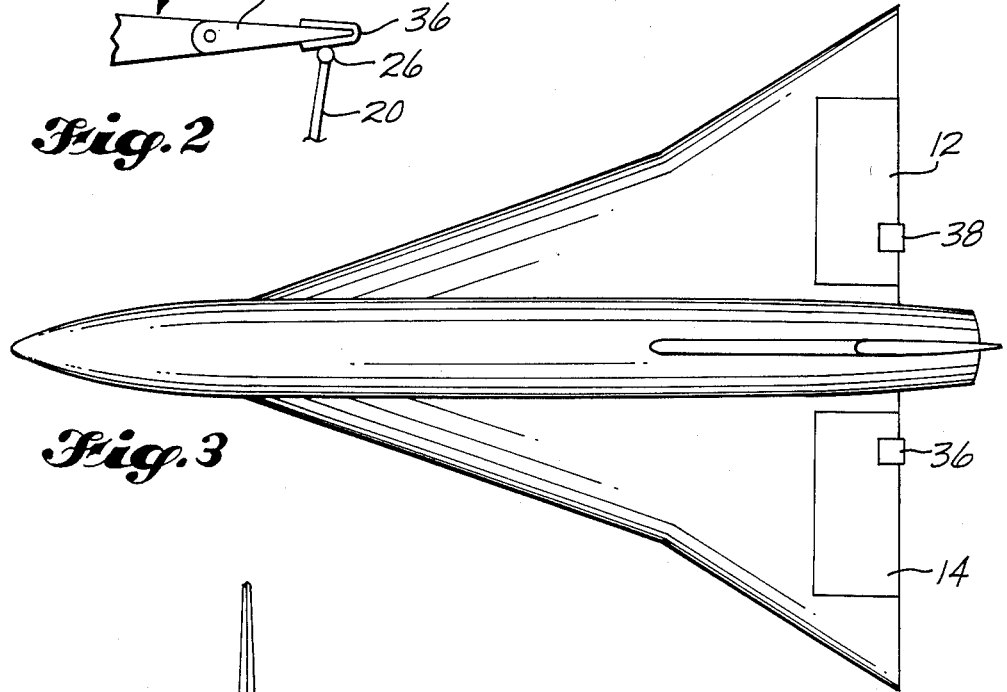
FIG. 3 is a plan view of the aircrafat shown in FIG. 1.
Figure 4:
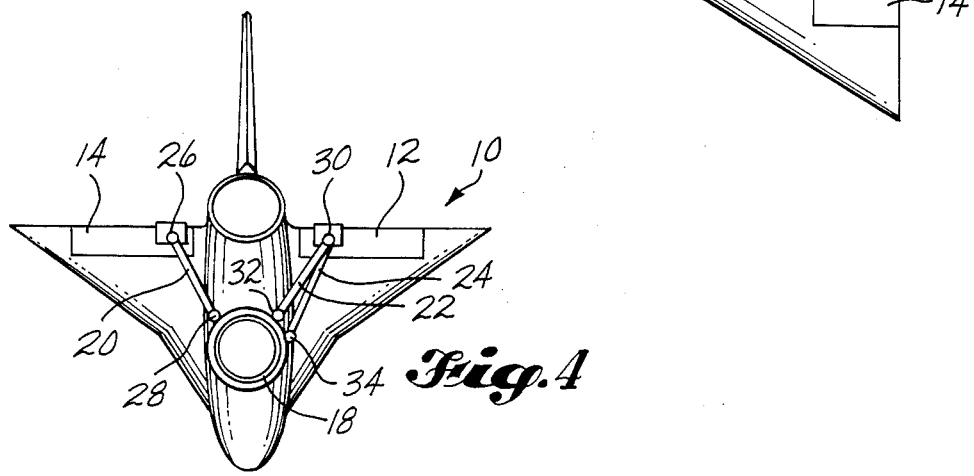
FIG. 4 is a rear end view of the aircraft and rocket booster shown in FIG. 1.

Referring again to the drawings, there is shown in FIGS. 1-4 a delta wing type aircraft 10 having elevons 12 and 14 adjacent the tail of the aircraft, the elevons being normally adapted to be operted by motion sensors and required logic for augmenting stability in post launch phases of flight, high speed flight, and landings. Such aerodynamic controls are sized to provide sufficient control power at these speeds. The present invention solves the stability and control problems encountered when boosters are used to shorten take-off distance. That is, the airplane flies before it is going fast enough for its conventional control, including the elevons 12 and 14, to provide adequate stability and control.

The solution of the problem is the use of a rocket booster motor 18, coupled to the elevons by supports or links 20 on one side and links 22 and 24 on the other side. Each of the links has ball joint ends as shown, FIG. 4, at 26, 28, 30, 32 and 34. This provides for the ability of universal movement. The links are connected to slip clamps 36 and 38 on the end of the aerodynamic surfaces of the elevons and which slide off of the elevons after take-off when the booster 18 is being detached. The booster is connected forwardly by a support member or link 40. At its forward end it is pivotally connected to the aircraft by a shear pin 42. Thus, after take-off the pin 42 is sheared and the rocket booster and the supporting links are disengaged from the aircraft, the clamps 36 and 38 slipping off of the elevons.

The invention provides that the booster be coupled to the aircraft, as described, and steerable by the conventional controls, such as the elevon surfaces 12 and 14 so that the booster thrust produces moments around the center of gravity 44 which supplement those produced by the conventional controls such as the elevons 12 and 14.

In FIG. 1 when the elevon is in the horizontal position the rocket motor thrust takes the direction of the arrow $T_1$ in alignment with the support 40 and the direction of thrust provided by the motor. By deflecting the elevons downwardlyl, the rocket motor is moved downwardly as shown by the broken lines and the thrust takes the direction of $T_3$ below the null position $T_1$. As shown in the downward position the thrust vector $T_3$ is directed above the center of gravity 44 so as to pitch the nose of the aircraft downwardly. Similarly, by directing the elevons upwardly as indicated by the thrust position of $T_2$, an upward pitch occurs.

Three supporting links as 20, 22, and 24 are required to ensure a unique rocket motor position and orientation for each elevon position. The retainer shear pin 42 releases the thrust arm 40 on the ignition of the rocket motor 18.

In FIGS. 5-9 the arrangements are similar to those shown in FIGS. 1-4, but in greater detail. An aircraft 50 is shown fragmentarily and has a booster rocket 52, shown schematically, coupled to the aircraft rearwardly of the center of gravity 54 by means of a detachable thrust arm 56 pivotally engaged to the aircrat at 58. The rear end 60 of the link or thrust arm 56 is fixed to the forward end of the rocket motor in alignment with the thrust. The rear end of the booster is supported on one side by two links 62, 64, FIG. 6, th links being connected to the aerodynamic surface of the elevon and the motor by ball and socket joints. On the other side of the aircraft and booster, there is a supporting link 66 also connected to the elevon 70 and booster by ball and socket joints. The rocket booster is connected to the aircraft, as indicated with respect to FIGS. 1-4, and when the rocket is ignited at take-off, it applies its thrust to the aircraft. After rocket motor burnout the total system disengages and falls away from the aircraft.

Figure 7:
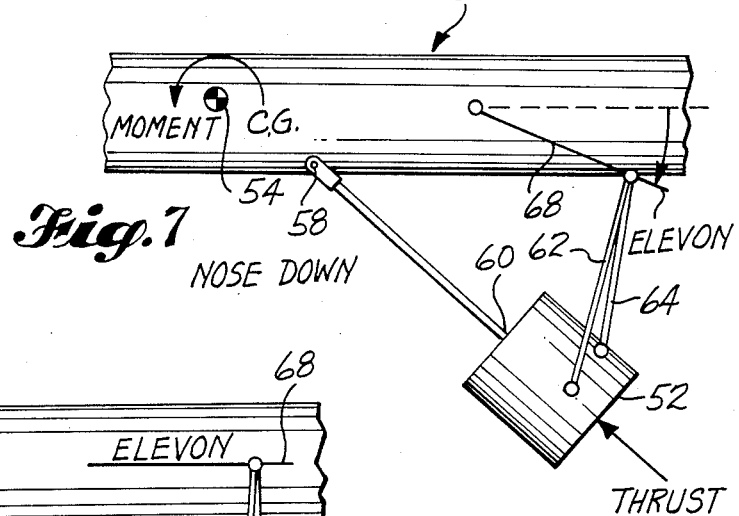
FIG. 7 is a side elevational view of the aircraft shown in FIG. 5 in which an elevon is deflected downwardly and the thrust vector is thereby directed above the center of gravity to pitch the nose downwardly.
Figure 5:
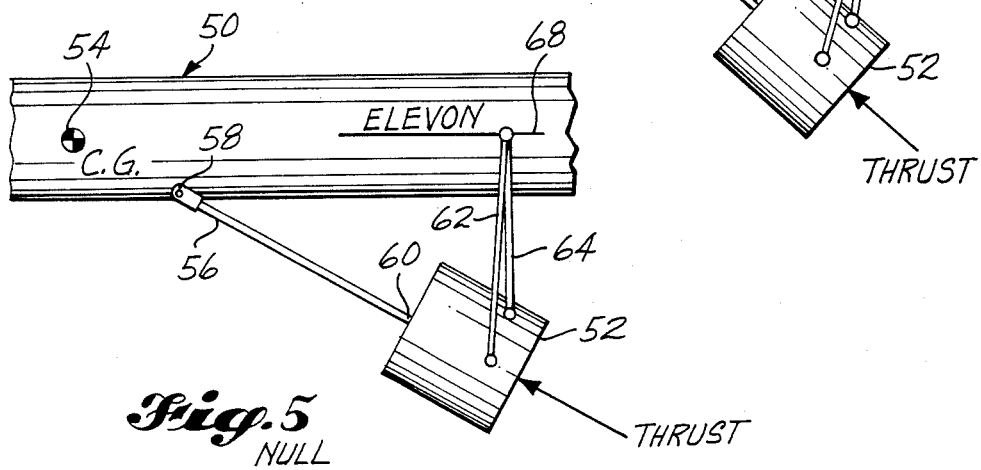
FIG. 5 is a side elevational schematic view of a rocket booster connected to an elevon on an aircraft, the elevon being in null or horizontal position.

As shown in FIG. 7, by deflecting the elevons down in their conventional operation, the thrust vector from the booster is directed above the center of gravity so as to pitch the nose downwardly as indicated by the moment arrow. Similarly, as shown in FIG. 8, by deflecting the elevon upwardly, the thrust vector being directed below the center of gravity and the pitch-up being indicated by the moment arrow.

As shown in FIG. 9, if the elevon 68 on one side of the aircraft is down and the other elevon 70 on the other side is up, a roll-yaw couple results as indicated by the arrows. As should be noted, this method of coupling, to the flight control surfaces and basic aircraft control system, requires no additional actuators; that is, other than in the basic aircrat system.

Figure 12:
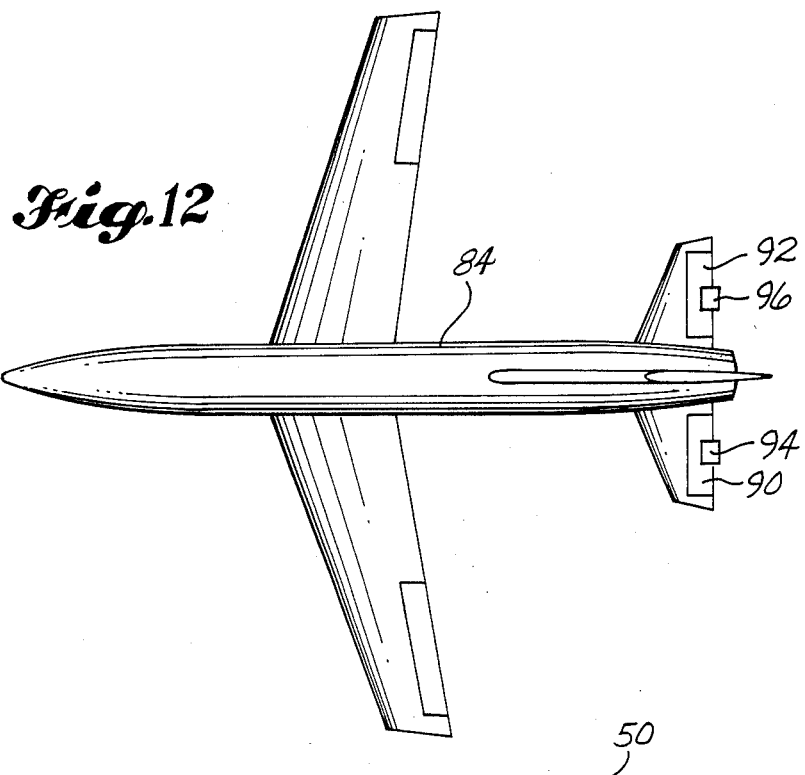
FIG. 12 is a plan view of the aircraft shown in Figs. 10 and 11, illustrating the elevators and their booster connections in the tail.

Another method of actution, where only elevators are available, that is, typically in an airplane 84 having a forwardly positioed wing, is illustrated in FIGS. 10-12. A rocket booster 80 is connectd forwardly to the aircraft by a detachable thrust arm or link 82 having a ball joint connection at the forward end and having its rearward end fixed to the rocket motor and in the direction of the thrust. There are two rearward supporting links 86 and 88, one on each side of the aircraft and each having a pivotal joint at both ends, one end being connectd to an elevator 90 on one side and an elevator 92 on the other side. Pivotal joints are connected to the aerodynamic surfaces of the elevators by means of slip-off clamps 94 and 96, FIG. 12, that are detached from the elevators when a shear pin in the forward end of the link 82 detaches the booster from the aircraft.

The links 86 and 88 are in respective pivot planes, FIG. 11, and their lower ends are pivotally connected to joints on a transverse link 98 which is slidably and rotatably engaged in a pivot-slide sleeve 100 fixed to the booster. An actuator 102, connected to the flight control system of the aircraft, by means not shown, for its operation, has one end pivotally connected to the link 88 and its other end connected by a ball and socket joint to the rocket booster 80. Pitch control for the aircraft is created in the same manner as shown in FIGS. 1-8 by raising and lowering the elevators to move the links 86 and 88 upwardly and downwardly to change the thrust vector, and the operation of the actuator 102 provides roll-yaw control by changing the direction of the thrust vector by moving the rocket to booster transversely with respect to the link 98 and the aircraft.

In FIGS. 13 and 14 an aircraft 110 having no aerodynamic control surfaces for actuation by the booster is provided with a separate system, according to the invention. In this embodiment a block 112 is secured to the underside of the aircraft and has a rearwardly directed concave spherical face 114. A thrust arm 116 has a spherical roller 118 at its forward end, the roller being adapted to move on the spherical face 114. The rearward end of the link or arm 116 is secured to a rocket booster 120 in alignment with the thrust.

A pair of angularly spaced actuators 124 and 126 have ball and socket joints at both ends and one end of each is joined to the thrust arm 116 between the spherical roller 118 and the rocket booster 120. The actuators are about 90° to each other and their respective ends 130 and 132 have ball and socket joints connected to the aircraft. The actuators are operated by motion sensing or other conventional means within the aircraft, not shown. The rear end of the booster is supported by two links 136 and 138 having ball and socket joints at both ends.

Operation of the actuators by the motion sensing means in the aircraft moes the forward thrust point formed by the spherical roller and thus, vectors the thrust as required by the actuators to provide pitch, roll, and yaw control which is developed by the thrust vectoring as in the other embodiments of the invention. Shear pins or other means are provided to disengage the rocket booster on ignition after it has functioned during the take-off phase.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. For use in aircraft having motion sensors and required logic coupled to aerodynamic controls, such as elevons, ailerons, elevators, and rudder, for augmenting stability in the post launch phases of climb, high speed flight, and landing;

a rocket booster motor for coupling to at least some of said controls so that the rocket booster thrust vector is directed in response to signals generated to the controls in the basic aircraft to provide additional stability and control required during a boosted launch phase, with no changes in the flight control logic or system, the invention comprising:

means for coupling a rocket booster motor to at least some of said controls so that when said coupled controls are operated in accordance with said signals from said motion sensors and/or logic to the controls, the rocket thrust vector is directed relative to the center of gravity of the aircraft to prevent generation of excessive torques, to avoid placing additional demands on the controls, to avoid severely limiting of available aerodynamic control at low launch speeds, and to provide pitch, roll, and yaw control, wherein said means for coupling are supporting links;

a forward link of said links having a forward end for pivotal connection to the aircraft aft of its center of gravity and having a rearward end fixed to the rocket motor;

a first rear link having ball joints at both ends, one of said ends of said first rear link being connectable to a control on one side of the aircraft;

the other end of said first rear link being connected to a corresponding one side of said rocket motor;

second and third rear links having ball joints at both ends, one of aid ends of each of said second and third rear links being connectable to a control on the other side of said aircraft;

the other ends of said second and third rear links being spacedly connected to a corresponding other side of said rocket motor.

2. The invention according to claim 1 in which: said controls are elevons.

3. The invention according to claim 2 in which: said forward link is positioned to be aligned with the direction of the rocket thrust.

4. For use in aricraft having motion sensors and required logic coupled to aerodynamic controls, such as elevons, ailerons, elevators, and rudder, for augmenting stability in the post launch phases of climb, high speed flight, and landing:

a rocket booster motor for coupling to at least some of said controls so that the rocket booster thrust vector is directed in response to signals generated to the controls in the basic aircraft to provide additional stability and control required during a boosted launch phase, with no changes in the flight control logic or system, the invention comprising:

means for coupling a rocket booster motor to at least some of said controls so that when said coupled controls are operated in accordance with said signals from said motion sensors and/or logic to the controls, the rocket thrust vector is directed relative to the center of gravity of the aircraft to prevent generation of excessive torques, to avoid placing additional demands on the controls, to avoid severely limiting of available aerodynamic control at low launch speeds, and to provide pitch, roll, and yaw control, wherein said means for coupling include supporting links;

a forward link of said links having a forward end for ball joing connection to the aircraft aft of its center of gravity and having a rear end fixed to the rocket motor;

a first rear link having pivotal joints at both ends and being connectable at one end to a control on one side of th aircraft and one side of the rocket motor;

a second rear link having pivotal joints at both ends and being connectable at one end to a control on the other side of the aircraft and the other side of the rocket motor;

a transverse link having one end connected to the other end of said first rear ink and having its other end connected to the other end of said second rear link, said links being joined in pivotal connections;

a pivot sleeve connected to said rocket motor and through which said transverse link is slidably and rotatably engaged; and a roll and yaw actuator having its operable shaft having its outer end joined to the rocket motor in a ball and socket connection, the operation of the shaft by th actuator being to move the motor transversely with respect to the aircraft;

said actuator being joined to one of said rar links at its other end and to a corresponding end of said transverse link in a pivotal connection, said actuator being connectable to receive signals generated in the basic aircraft for operation.

5. The invention according to claim 4 in which: said controls are elevators.

6. The invention according to claim 5 in which: said forward link is positioned to be aligned with the direction of the rocket thrust.

7. For use in aircraft for providing additional stability and control required during a booster launch phase, a rocket booster motor for coupling to the aircraft so that the rocket booster thrust vector is directed in response to controls in the basic aircraft, with no changes in the flight control or logic system, the invention comprising:

means for coupling a rocket booster motor to the aircrat to respond to controls in the aircraft so that the rocket thrust vector is directed relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

said means for coupling including a forward link having a spherical roller on its forward end for rollable contact on a concave spherical member securable to the aircraft and having a rearward end fixed to the rocket motor;

a first rear link having ball joints at both ends, one of said ends of said first rear link being connectable to the aircraft;

the other end of said first rear link being connected to the rocket motor;

a second rear link having ball joints at both ends, one of said ends of said first rear link being connectable to the aircrat;

the other end of said second rear link being connected to the rocket motor; and a pair of actuators having one end of each joining said forward link between the spherical roller and its fixed end;

said actuators being angularly positioned so that their other ends are spaced and are connectable to the aircraft;

whereby a forward thrust point in the spherical roller is movable on the concave spherical member by the actuators to provide pitch, roll, and yaw control to the aircraft through the thrust vector of the rocket motor.

8. The invention according to claim 7 in which: said forward link is positioned to be aligned with the direction of the rocket thrust.

9. An aircraft having a rocket booster motor coupled thereto for providing additional stability and control required during a booster launch phase so that the rocket booster thrust is directed in response to controls in the basic aircraft, comprising:

means coupling a rocket booster motor to the aircraft to respond to flight controls in the aircraft so that the rocket thrust vector is directed relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

said means for coupling include a forward link having a spherical roller on its forward end for rollable contact on a concave spherical member secured to the aircraft and having a rearward end fixed to the rocket motor;

a first rear link having ball joints at both ends, one of said ends of said first rear link being connected to the aircraft;

the other end of said first rear link being connected to the rocket motor;

a second rear link having ball joints at both ends, one of said ends of said second rear link being connected to the aircraft;

the other end of said second rear link being connected to the rocket motor;

a pair of actuators having one end of each joining said forward link between the spherical roller and its fixed end; and said actuators being angularly positioned so that their other ends are spaced and connected to the aircraft;

whereby a forward thrust point in the spherical roller is movable on the concave spherical member by the actuators to provide pitch, roll, and yaw control to the aircraft through the thrust vector of the rocket motor.

10. The invention according to claim 9 in which:
said forward link is positioned in alignment with the direction of the rockt thrust.

11. An aircraft having a rocket booster motor coupled thereto for providing additional stability and control required during a booster launch phase so that the rocket booster thrust is directed in response to controls in the basic aircraft, comprising:

means coupling a rocket booster motor to the aircraft to respond to flight controls in the aircraft so that the rocket thrust vector is directed relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

the aircraft having aerodynamic control surfaces for coupling to controls in the aircraft for augmenting stability in the post launch phases of climb, speed flight, and landing;

said means for coupling being supporting links;

a forward link of said links having a forward end pivotally connected to the aircraft aft of its center of gravity and having a rearward end fixed to the rocket motor;

a first rear link having ball joints at both ends, one of said ends of said first rear link being connected to an aerodynamic control surface on one side of the aircraft;

the other end of said first rear link being connected to a corresponding one side of said rocket motor;

second and third rear links having ball joints at both ends, one of said ends of each of said second and third rear links being connected to an aerodynamic control surface on the other side of the aircraft;

the other ends of said second and third rear links being spacedly connected to a corresponding other side of said rocket motor.

12. The invention according to claim 11 in which:
said aerodynamic controls are elevons.

13. The invention according to claim 12 in which:
said forward link is aligned with the direction of the rocket thrust.

14. An aircraft having a rocket booster motor coupled thereto for providing additional stability and control required during a booster launch phase so that the rocket booster thrust is directed in response to controls in the basic aircraft, comprising:

means coupling a rocket booster motor to the aircraft to respond to flight controls in the aircraft so that the rocket thrust vector is directed relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

the aircraft having aerodynamic control surfaces for coupling to controls in the aircraft for augmenting stability in the post launch phases of climb, speed flight, and landing;

said means for coupling including supporting links;

a forward link of said links having a forward end ball joint connected to the aircraft aft of its center of gravity and having a rear end fixed to the rocket motor;

a first rear link having pivotal joints at both ends and being connected at one end to an aerodynamic control surface on one side of the aircraft and on one side of the rocket motor;

a second rear link having pivotal joints at both ends and being connected at one end to an aerodynamic control surface on the other side of the aircraft and the other side of the rocket motor;

a transverse link having one end connected to the other end of said first rear link and having its other end connected to the other end of said second rear link, said links being joined in pivotal connections;

a pivot sleeve connected to said rocket motor and through which said transverse link is slidably and rotatably engaged; and a roll and yaw actuator having its operable shaft having its outer end joined to the rocket motor in a ball and socket connection, the operation of the shaft by the actuator being to move the motor transversely with respect to the aircraft;

said actuator being joined to one of said rear links at its other end and to a corresponding end of said transverse link in a ball and socket connection, and being operated by the flight controls.

15. The invention according to claim 14 in which:
said aerodynamic control surfaces are on elevators.

16. The invention according to claim 15 in which:
said forward link is in alignment with the direction of the rocket thrust.

17. A method of providing additional stability and control to aircraft during a booster launch phase when a booster is used to shorten takeoff distance and the aircraft files before it is going fast enough for its conventional controls to provide adequate stability and control, comprising:

coupling a rocket booster motor to the aircraft so that the rocket booster thrust vector is directed in response to controls in the basic aircraft; and directing the rocket thrust vector relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

said rocket booster motor is coupled to an aircraft by:

a forward link having a spherical roller on its forward end for rollable contact on a concave spherical member securable to the aircraft and having a rearward end fixed to the rocket motor;

a first rear link having ball joints at both ends, one of said ends of the first rear link being connectable to the aircraft; the other end of said first rear link being connected to the rocket motor;

a second rear link having ball joints at both ends, one of said ends of the second rear link being connectable to the aircraft; the other end of said second rear link being connected to the rocket motor; and a pair of actuators having one end of each joining said forward link between the spherical roller and its fixed end;

said actuators being angularly positioned so that their other ends are spacedly connectable to the aircraft;

whereby a forward thrust point in the spherical roller is movable on the concave spherical member by the actuators to provide pitch, roll, and yaw control to the aircraft through the thrust vector of the rocket motor.

18. The method according to claim 17 including:
positioning the forward link to be in alignment with the direction of the rocket thrust.

19. A method of providing additional stability and control to aircraft during a booster launch phase when a booster is used to shorten takeoff distance and the aircraft flies before it is going fast enough for its conventional controls to provide adequate stability and control, comprising:

coupling a rocket booster motor to the aircraft so that the rocket booster thrust vector is directed in response to controls in the basic aircraft; and directing the rocket thrust vector relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

the rocket booster motor being coupled in part to aerodynamic control surfaces in the aircraft and which said control surfaces are coupled to controls in the aircraft for augmenting stability in the post-launch phases of climb, speed flight and landing;

coupling said rocket motor to the aircraft and aerodynamic control surfaces by supporting links;

a forward link of said links having a forward end pivotally connected to the aircraft aft of its center of gravity and having a rearward end fixed to the rocket motor;

a first rear link having ball joints at both ends, one of said ends of said first rear link being connected to an aerodynamic control surface on one side of the aircraft;

the other end of said first rear link being connected to a corresponding one side of said rocket motor;

second and third rear links having ball joints at both ends, one of said ends of each of said second and third rear links being connected to an aerodynamic control surface on the other side of the aircraft;

the other ends of said second and third rear links being spacedly connected to a corresponding other side of said rocket motor.

20. The method according to claim 19 in which:
said aerodynamic controls are elevons.

21. The method according to claim 20 in which:
said forward link is aligned with the direction of the rocket thrust.

22. A method of providing additional stability and control to aircraft during a booster launch phase when a booster is used to shorten take-off distance and the aircraft flies before it is going fast enough for its conventional controls to provide adequate stability and control, comprising:

coupling a rocket booster motor to the aircraft so that the rocket booster thrust vector is directed in response to controls in the basic aircraft; and directing the rocket thrust vector relative to the center of gravity of the aircraft to maintain stability of the aircraft, to prevent generation of excessive torques, to avoid placing additional demands on the aircraft structure, to avoid severely limiting of available aerodynamic control at low launch speeds, and to provide pitch, roll, and yaw control;

the coupling of the rocket booster being in part to aerodynamic control surfaces coupled to controls in the aircraft for augmenting stability in the post-launch phases of climb, speed flight, and landing;

the rocket booster motor being coupled to the aircraft and control surfaces by supporting links;

a forward link of said links having a forward end ball joint connected to the aircraft aft of its center of gravity and having a rear end fixed to the rocket motor;

a first rear link having pivotal joints at both ends and being connected at one end to an aerodynamic control surface on one side of the aircraft and on one side of the rocket motor;

a second rear link having pivotal joints at both ends and being connected at one end to an aerodynamic control surface on the other side of the aircraft and the other side of the rocket motor;

a transverse link having one end connected to the other end of said first rear link and having its other end connected to the other end of said second rear link, said links being joined in pivotal connections;

a pivot sleeve being connected to said rocket motor and through which said transverse link is slidably and rotatably engaged; and a roll and yaw actuator having its operable shaft having its outer end joined to the rocket motor in a ball and socket connection, the operation of the shaft by the actuator being to move the motor transversely with respect to the aircraft;

said actuator being joined to one of said links at its other end and to a corresponding end of said transverse link in a pivotal connection, and being operable by the flight controls.

23. The method according to claim 22 in which:
said aerodynamic control surfaces are on elevators.

24. The method according to claim 23 in which:
said forward link is in alignment with the direction of the rocket thrust.

* * * * *

UNITED STATES PATENT AND TRADEMARK OFFICE
CERTIFICATE OF CORRECTION

PATENT NO. : 4,721,271

DATED : January 26, 1988

INVENTOR(S) : Sidney E. Goldstein and Ronald J. Pera

It is certified that error appears in the above-identified patent and that said Letters Patent are hereby corrected as shown below:

Title page:

In the Abstract, 6th line from the top, "is" should be -- in --.

Column 1, line 17, "ther" should be -- there --.

Column 1, line 38, "booster" should be -- boosted --.

Column 1, line 54, "defletor" should be -- deflector --.

Column 1, lines 54 and 55, "incororated" should be -- incorporated --.

Column 2, line 5, "Robert," should be -- Robert --.

Column 2, line 16, "landings. the" should be -- landings. The --.

Column 2, line 46, "genertion" should be -- generation --.

Column 2, line 48, "aovid" should be -- avoid --.

Column 2, line 53, "supportin glinks" should be -- supporting links --.

Column 2, line 54, "tis" should be -- its --.

Column 3, line 1, "provie" should be -- provide --.

Column 3, line 12, "th" should be -- the --; and "connectd" should be -- connected --.

Column 3, line 26, "moes" should be -- moves --.

Column 3, line 30, "manging" should be -- managing --.

Column 3, line 56, "aircrafat" should be -- aircraft --.

UNITED STATES PATENT AND TRADEMARK OFFICE
CERTIFICATE OF CORRECTION

PATENT NO. : 4,721,271
DATED : January 26, 1988
INVENTOR(S) : Sidney E. Goldstein and Ronald J. Pera It is certified that error appears in the above-identified patent and that said Letters Patent are hereby corrected as shown below:

Column 4, line 29, "operted" should be -- operated --.
Column 4, line 64, "T$_1$in" should be -- T$_1$ in --.
Column 4, line 66, "downwardly1," should be -- downwardly --.
Column 4, line 68, after "position", insert -- of --.
Column 5, line 16, "aircrat" should be -- aircraft --.
Column 5, line 18, "with-" should be -- with --.
Column 5, line 20, "th" should be -- the --.
Column 5, line 44, "aircrat" should be -- aircraft --.
Column 5, line 45, "actution" should be -- actuation --.
Column 5, line 47, "positioed" should be -- positioned --.
Column 5, line 48, "connectd" should be -- connected --.
Column 5, lines 54 and 55, "connectd" should be -- connected --.
Column 6, line 31, "moes" should be -- moves --.
Claim 1, column 7, line 16, "aid" should be -- said --.
Claim 4, column 7, line 28, "aricraft" should be -- aircraft --.
Claim 4, column 7, line 32, "landing:" should be -- landing; --.

UNITED STATES PATENT AND TRADEMARK OFFICE
CERTIFICATE OF CORRECTION

PATENT NO. : 4,721,271

DATED : January 26, 1988

INVENTOR(S) : Sidney E. Goldstein and Ronald J. Pera

It is certified that error appears in the above-identified patent and that said Letters Patent are hereby corrected as shown below:

Claim 4, column 7, line 54, "joing" should be -- joint --.

Claim 4, column 7, line 59, "th" should be -- the --.

Claim 4, column 7, line 66, "ink" should be -- link --.

Claim 4, column 8, line 7, "th" should be -- the --.

Claim 4, column 8, line 9, "rar" should be -- rear --.

Claim 7, column 8, line 26, "aircrat" should be -- aircraft --.

Claim 7, column 8, line 47, "aircrat;" should be -- aircraft --.

Claim 10, column 9, line 37, "rockt" should be -- rocket --.

Claim 17, column 10, line 66, "files" should be -- flies --.

Signed and Sealed this

Ninth Day of August, 1988

Attest:

DONALD J. QUIGG

*Attesting Officer*     *Commissioner of Patents and Trademarks*